US012289805B1

(12) United States Patent
Campbell et al.

(10) Patent No.: US 12,289,805 B1
(45) Date of Patent: Apr. 29, 2025

(54) HEATING DEVICE FOR USE WITH IRRIGATION TUBING, PIPE, AND COMPONENTS

(71) Applicants: Vance D. Campbell, Encinitas, CA (US); Cory McClusky, Encinitas, CA (US); Joe Nebolon, Encinitas, CA (US)

(72) Inventors: Vance D. Campbell, Encinitas, CA (US); Cory McClusky, Encinitas, CA (US); Joe Nebolon, Encinitas, CA (US)

(73) Assignee: Irriglide LLC, Encinitas, CA (US)

( * ) Notice: Subject to any disclaimer, the term of this patent is extended or adjusted under 35 U.S.C. 154(b) by 0 days.

(21) Appl. No.: 18/742,192

(22) Filed: Jun. 13, 2024

Related U.S. Application Data

(60) Provisional application No. 63/569,394, filed on Mar. 25, 2024, provisional application No. 63/607,814, filed on Dec. 8, 2023.

(51) Int. Cl.
*H05B 3/06* (2006.01)

(52) U.S. Cl.
CPC .................................... *H05B 3/06* (2013.01)

(58) Field of Classification Search
CPC ... H05B 3/00; H05B 3/06; H05B 3/04; H05B 3/08; H05B 3/20; H05B 3/22; H05B 3/40; H05B 3/42; H05B 3/44; H05B 3/46; H05B 3/48; H05B 3/50; H05B 3/52
USPC .......................................................... 219/520
See application file for complete search history.

(56) References Cited

U.S. PATENT DOCUMENTS 3,706,824 A * 12/1972 Huber et al. ............ F23D 91/02 432/224
4,255,137 A * 3/1981 Guyer ................... B29B 13/025 432/225
5,505,898 A * 4/1996 Goto ................... B29C 65/3676 285/21.2
2013/0157209 A1* 6/2013 Gillanders ............... H05B 3/06 432/227
2014/0001172 A1* 1/2014 Parzick ..................... F24H 1/06 219/386

* cited by examiner

*Primary Examiner* — Sang Y Paik
(74) *Attorney, Agent, or Firm* — Sam Pierce

(57) ABSTRACT

According to an aspect of the present invention, there is provided a device for heating the ends of irrigation piping or drip line irrigation tubing, comprising: a heating element; a housing for the heating element; and a power source for the heating element. The housing for the heating element is configured to receive drip line irrigation tubing so as to facilitate the ease of installation of the tubing onto various connectors while ensuring an improved and more robust connection and avoiding unwanted detachment following installation.

18 Claims, 14 Drawing Sheets

HEATING DEVICE FOR USE WITH IRRIGATION TUBING, PIPE, AND COMPONENTS

BACKGROUND

Irrigation systems including trickle or drip irrigation systems include conduits for delivering the irrigation water in small quantities directly to the plants being irrigated. The water is merely dripped onto the soil adjacent the plant or is delivered as a very slow, steady trickle to the soil. This is done so that soil pore spaces are never completely filled with water and oxygen is always available to the plant roots and soil microbes.

More conventional irrigation systems often include sprinkler heads that are designed for irrigation of broader areas including lawns and landscaped or planted areas in commercial growing businesses and recreation facilities such as golf courses. Often these types of irrigation systems use a flexible tube or pipe segment as the final connection to the sprinkler head so as to allow the system to flex rather than break in the instance that the head is stepped on or driven over by vehicles. These segments are often referred to as "flex pipe", or "swing pipe".

Distribution tubing, flex pipes, molded fittings and valves in such systems are generally made of strong and relatively thick plastic materials. In most of the above-described drip irrigation systems and systems that incorporate flex pipe, the connecting components incorporate barb shapes designed to securely retain the tubing or pipe in place. However, for anyone that has ever tried to push a barbed fitting or connector into cold tubing on a cold day, it is well known that it can be frustrating and a struggle, but even in normal temperatures it often is difficult to optimally establish an ideal connection because of the forces necessary to press on the connectors to the optimum depth.

One method used by drip irrigation professionals is to briefly insert the end of a piece of micro tubing into a cup of hot water, or heat with a heat gun or flame from an lighter before attempting to push molded fittings into the tubing-small and large. This is often helpful, but awkward, not ideal, and clearly, better methods are urgently needed.

SUMMARY OF INVENTION

Therefore, the present invention provides safe and easy devices and methods for heating the ends of drip line irrigation tubing or flex pipe of the typical sizes for these products (usually ¼" and ½"), but not limited to those sizes, and doing so quickly and effectively in a repeatable manner.

According to an aspect of the present invention, there is provided a device for heating drip line irrigation tubing, and flexible pipe, comprising: a heating element; a housing for the heating element; and a power source for the heating element, wherein the housing for the heating element is configured to receive tubing and pipe of one or more sizes so as to properly position the heating element in contact with the tubing or pipe, and apply heat precisely and only to where it is needed.

According to another aspect of the present invention, there is provided another method of directly heating drip line irrigation tubing or flex pipe by using a heating element to heat up to the proper depth and duration, comprising: providing a heating element; providing a housing for the heating element; providing a power source for the heating element that may incorporate internal or external batteries, or other potential source like a direct AC connection, or even an alternate source of power such as butane; and bringing the heating element in contact with the tubing or pipe placed inside the housing by the user.

According to another aspect of the present invention, there is provided another method of directly heating drip line irrigation tubing or flex pipe by using a heating element to heat up a reservoir of liquid to a specified temperature allowing for the tubing or pipe to be immersed to a specified depth into the reservoir.

According to another aspect of the present invention, the invention facilitates achieving optimum temperature for ease of insertion of tubing or piping into or onto connectors and devices.

According to another important aspect of the present invention, following the heating and installation of the tubing over or into the connector, the tubing cools and shrinks to the contours of the connector. The result is a more robust connection that is much less likely to fail in the future.

It has been noted by the inventors that when tubing has been physically forced onto a connecter by brute force, the tubing becomes permanently distorted by that force and thus renders the integrity of the connection resulting in a greater likelihood of failure of the connection in the future.

According to another aspect of the present invention, the heating element is surrounded by protective material associated with the enclosure or integrated with the enclosure and designed and configured to be appropriately water resistant for field conditions.

DETAILED DESCRIPTION OF THE DRAWINGS

Figure 1:
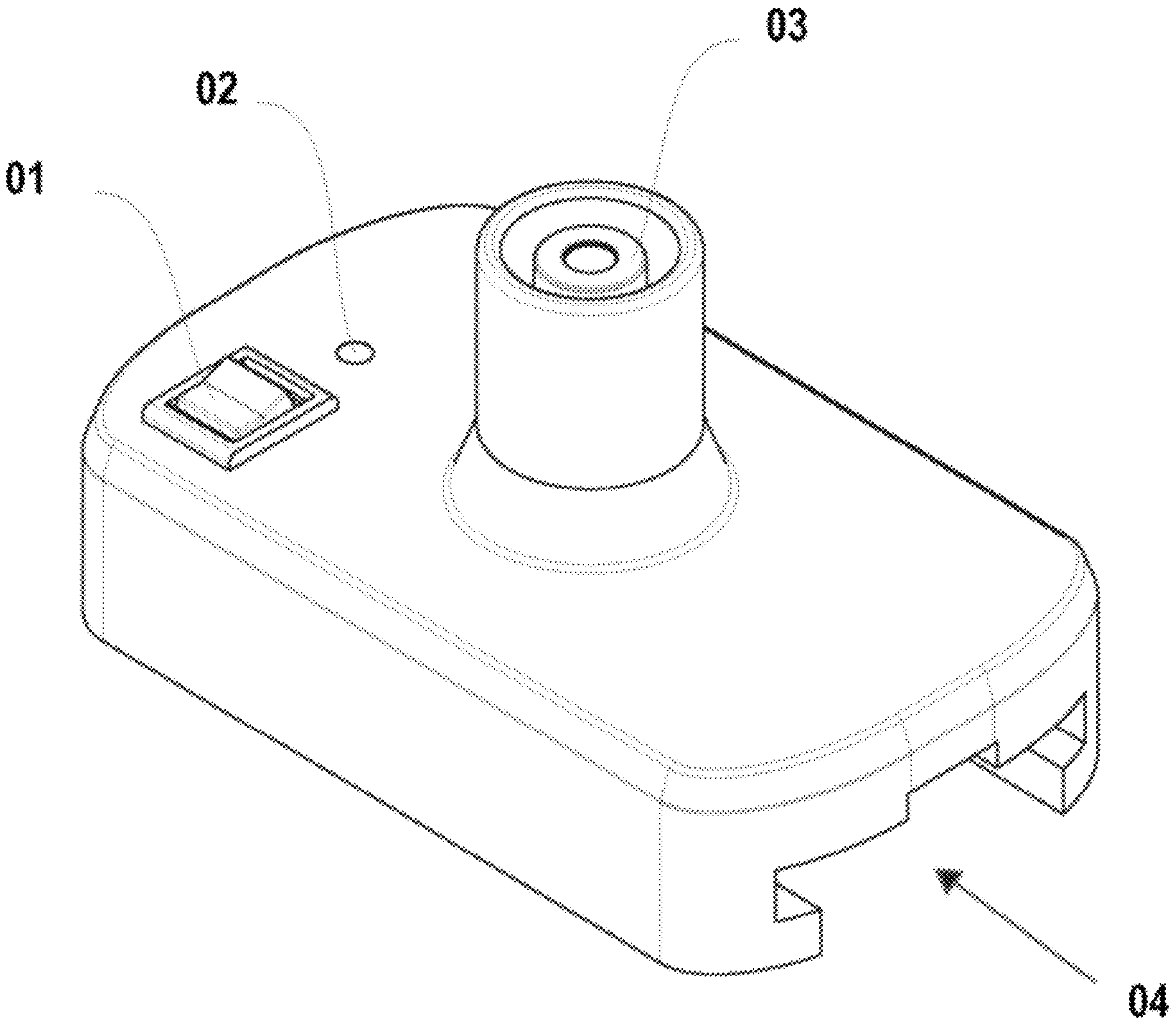
FIG. 1 is a commercial device that is designed to mate to a power tool battery.

FIG. 1 illustrates a commercial device that is designed to mate to a power tool battery, and that can be configured to the various power tool connector configurations 04 that vary from brand to brand.

The device encompasses a temperature-controlled heat head 03, a power switch 01, and a power/recharge light 02 that shows the current status of the device, (on vs charging, etc.) according to an embodiment.

The heating element 03 inside the heat head may be housed in a heat-resistant cylindrical housing, for example. Heating element 03 is shown inside cylindrical housing.

The heaters may be sized for multiple sizes of tubing, and ½" flex-pipe small drip tubing that is usually approximately ¼" OD, and ½" drip tubing. The typical tubing sizes are ¼ and ½" but other sizes can be accommodated so the device is not limited to those two sizes. The heater assembly could also be sized to accommodate more than 2 sizes.

Power switch 01 allows the device to be turned on and off and indicator light 02 allows the user to see if power is flowing to the device, or if battery is charging.

The device can have an onboard temperature regulator, which can be adjusted via a circuit board, or alternate means.

Figure 2:
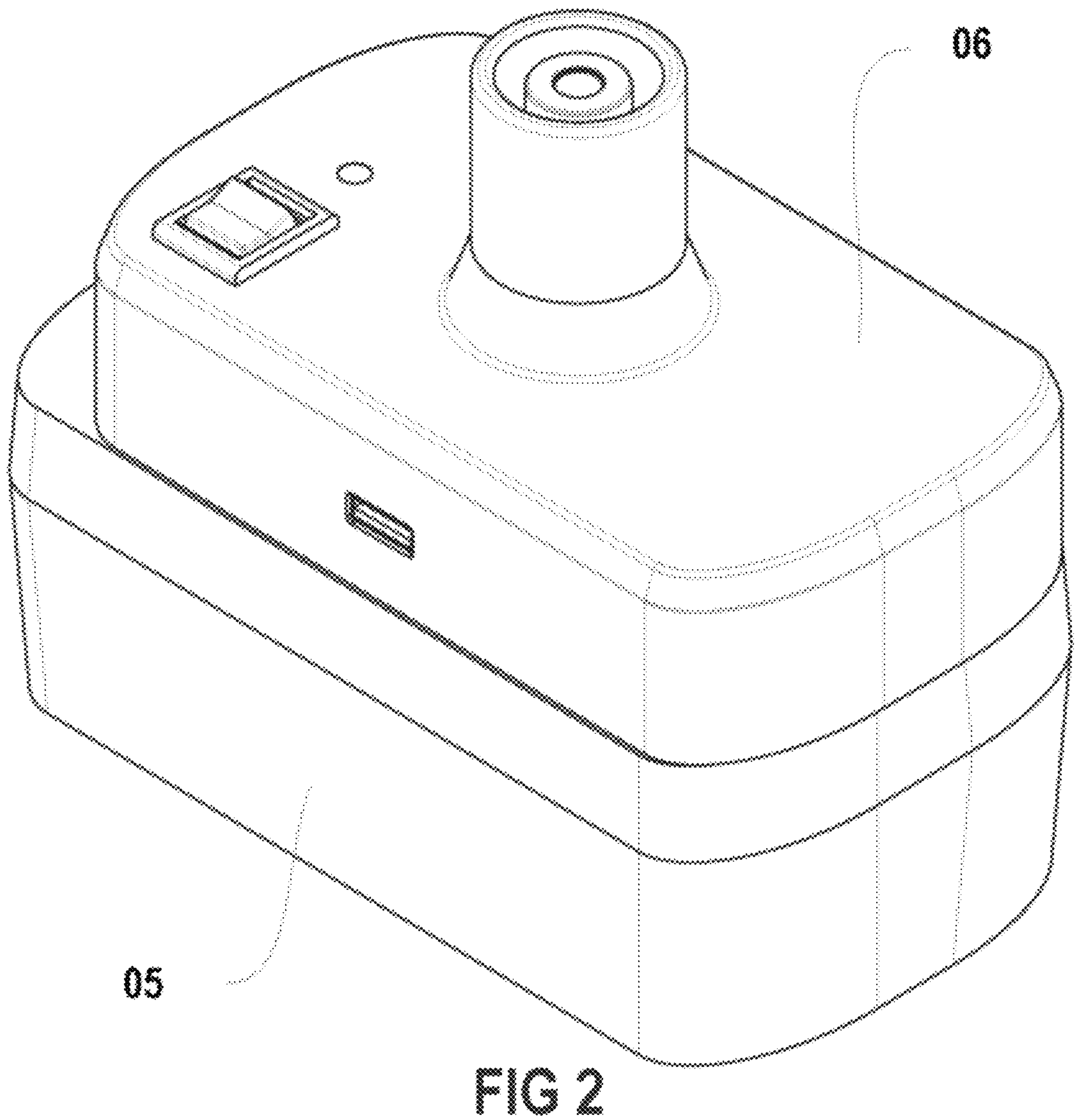
FIG. 2 is a commercial device mated to standard power tool battery.

FIG. 2 illustrates the commercial device (06) mated with a power tool battery (05) according to an embodiment.

The device can be reconfigured to mate to most all configurations of power tool manufacturers according to other embodiments.

The commercial device is intended to be used in the field attached to the battery so the device typically will not need its own batteries-because it is intended for commercial application, it is assumed that much more battery power will be necessary.

Figure 3:
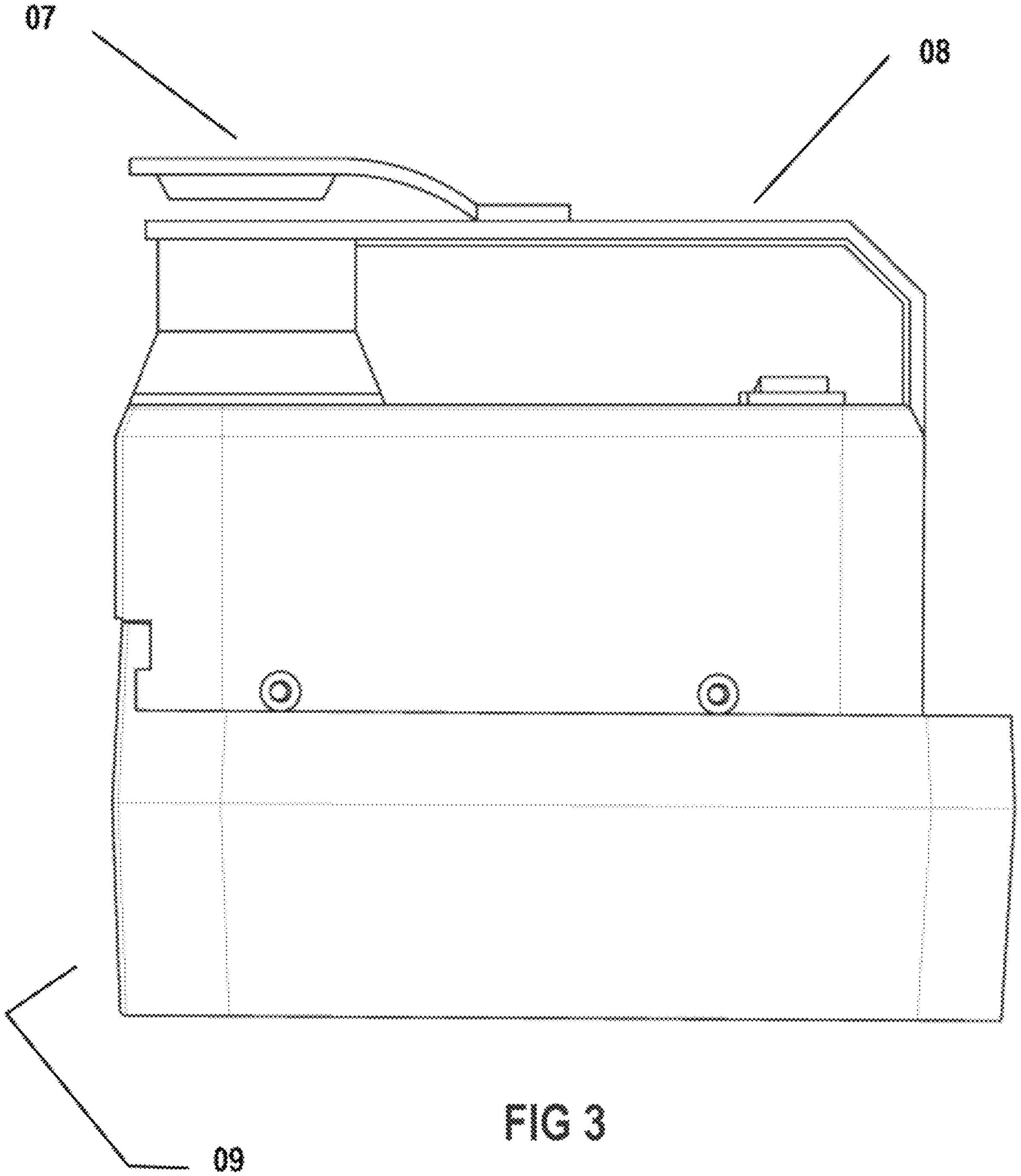
FIG. 3 is a commercial device with handle and rain cap.

FIG. 3 illustrates a device mated to a power tool battery as in FIG. 2, but with the addition of a carry handle (08) and a protective rain cap (07) according to another embodiment.

Figure 4:
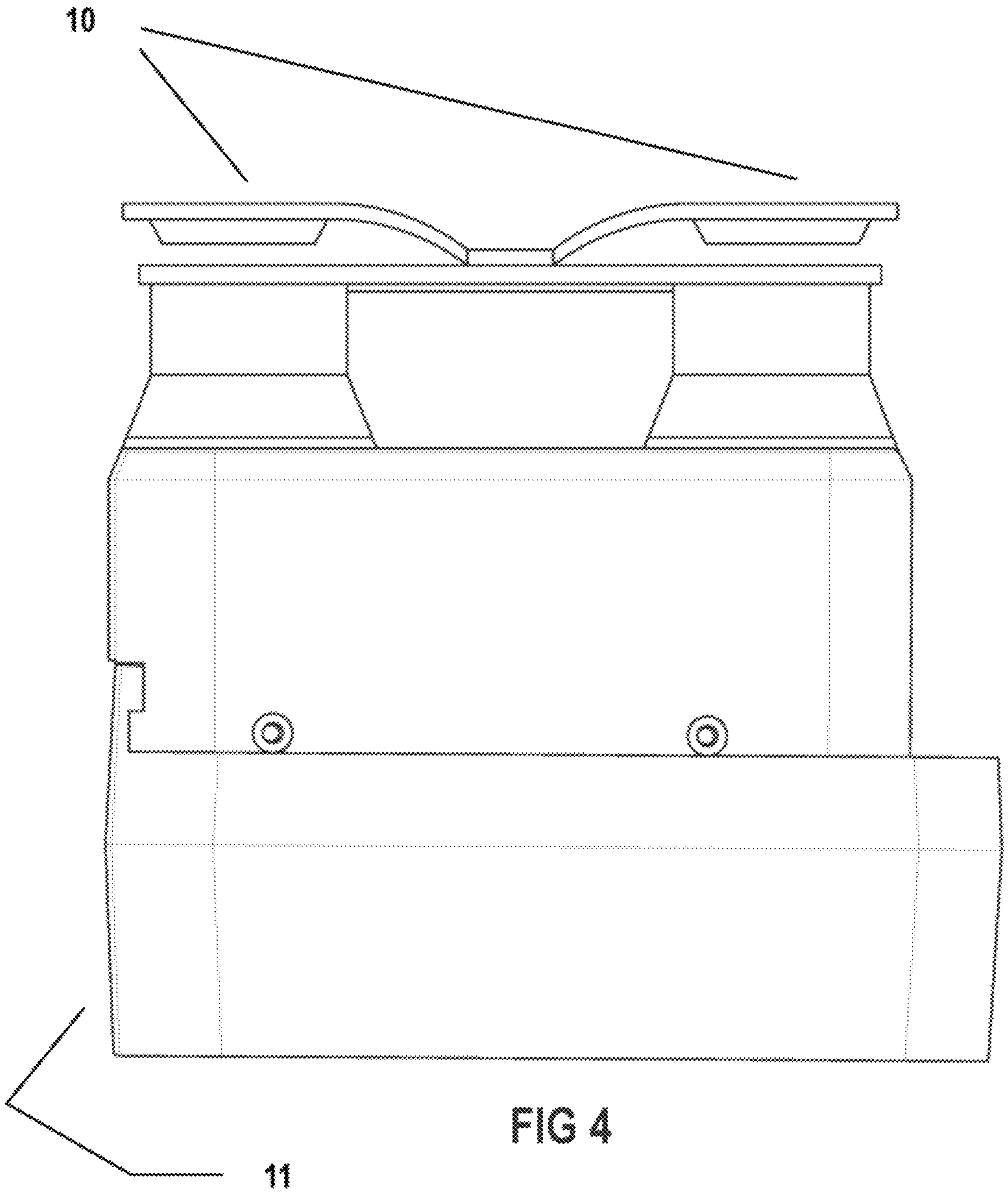
FIG. 4 is a two headed commercial device with rain caps.

FIG. 4 illustrates a device as in FIG. 3, also mated to a Power Tool Battery (11) but including two separate Heat Heads along with a rain cap component (10) for the two heads according to another embodiment.

Figure 5:
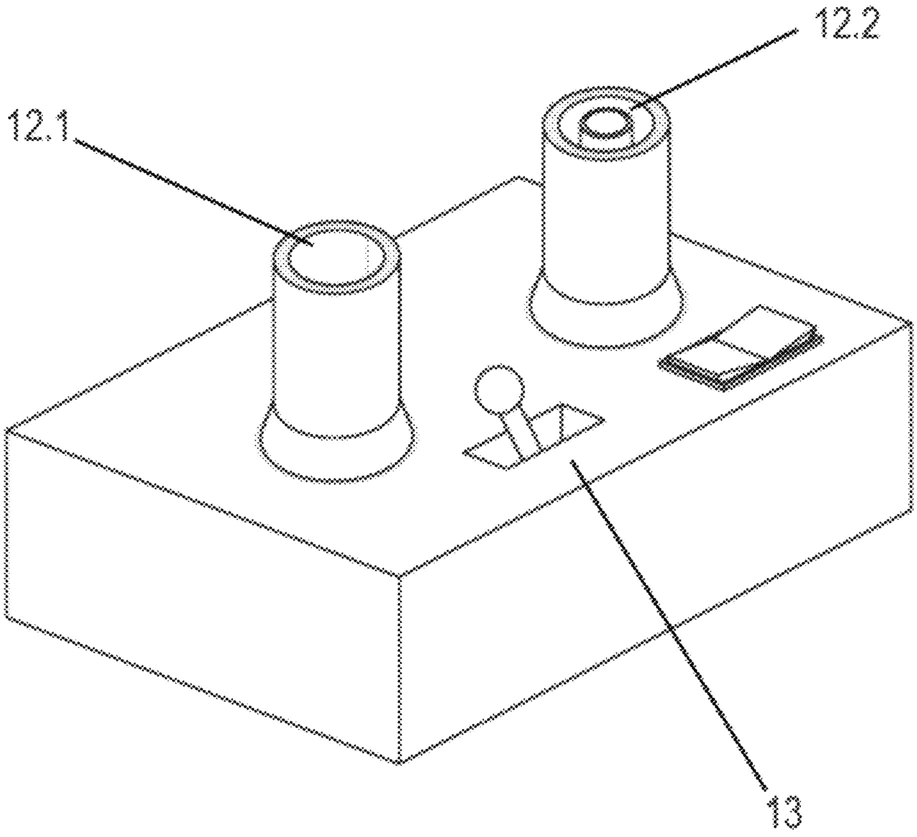
FIG. 5 is a two headed device with toggle for head heat control.

FIG. 5 illustrates a two-headed device (12.1 and 12.2) with a power disbursement toggle (13) that can control the power to the heat heads individually or simultaneously according to another embodiment.

Figure 6:
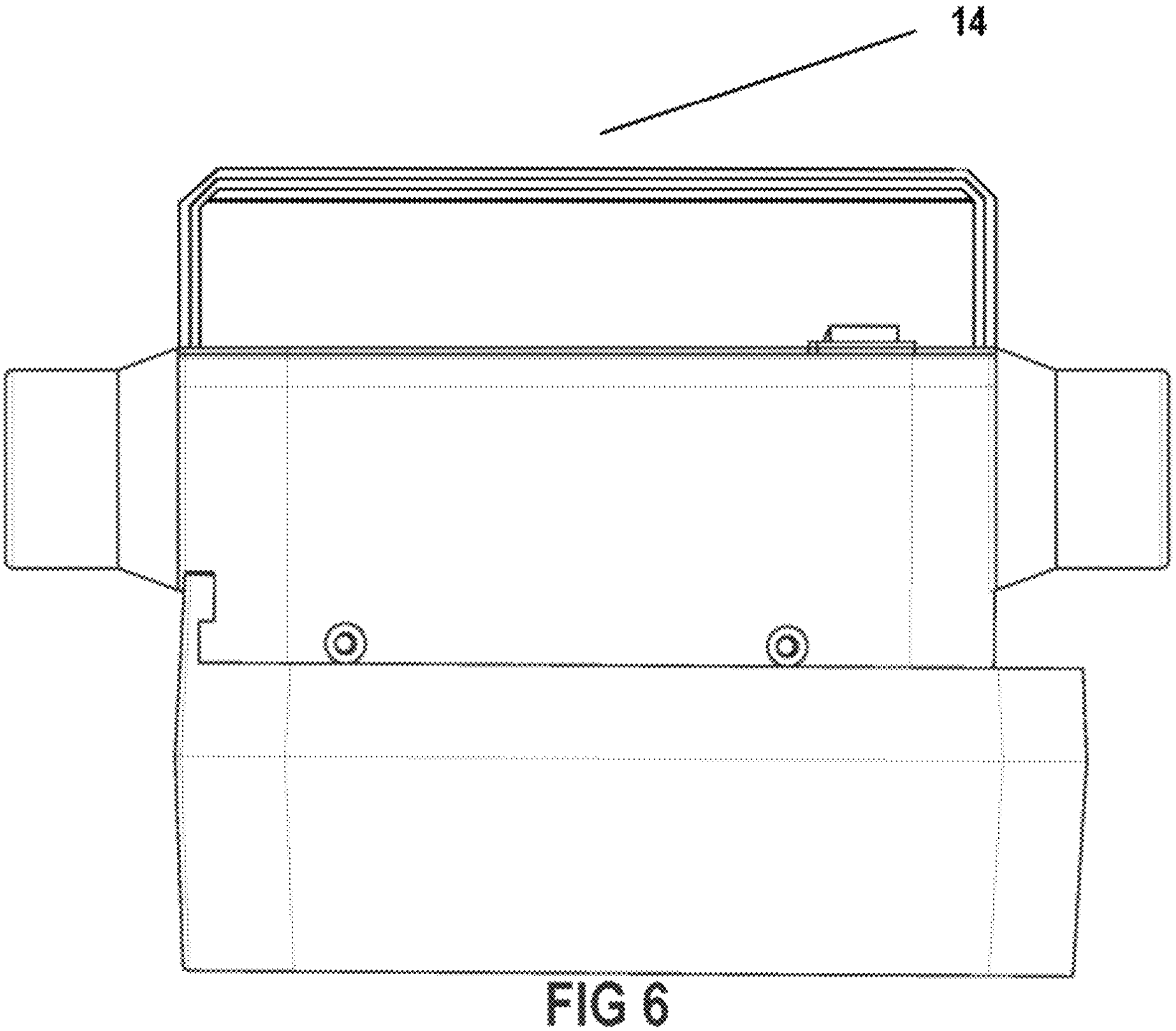
FIG. 6 is a two headed device with horizontally opposed heat heads.

FIG. 6 illustrates a two-headed device with horizontally opposed configuration and with the addition of a carry handle (14) and can be configured with the toggle controller as featured in FIG. 5 according to another embodiment.

Figure 7:
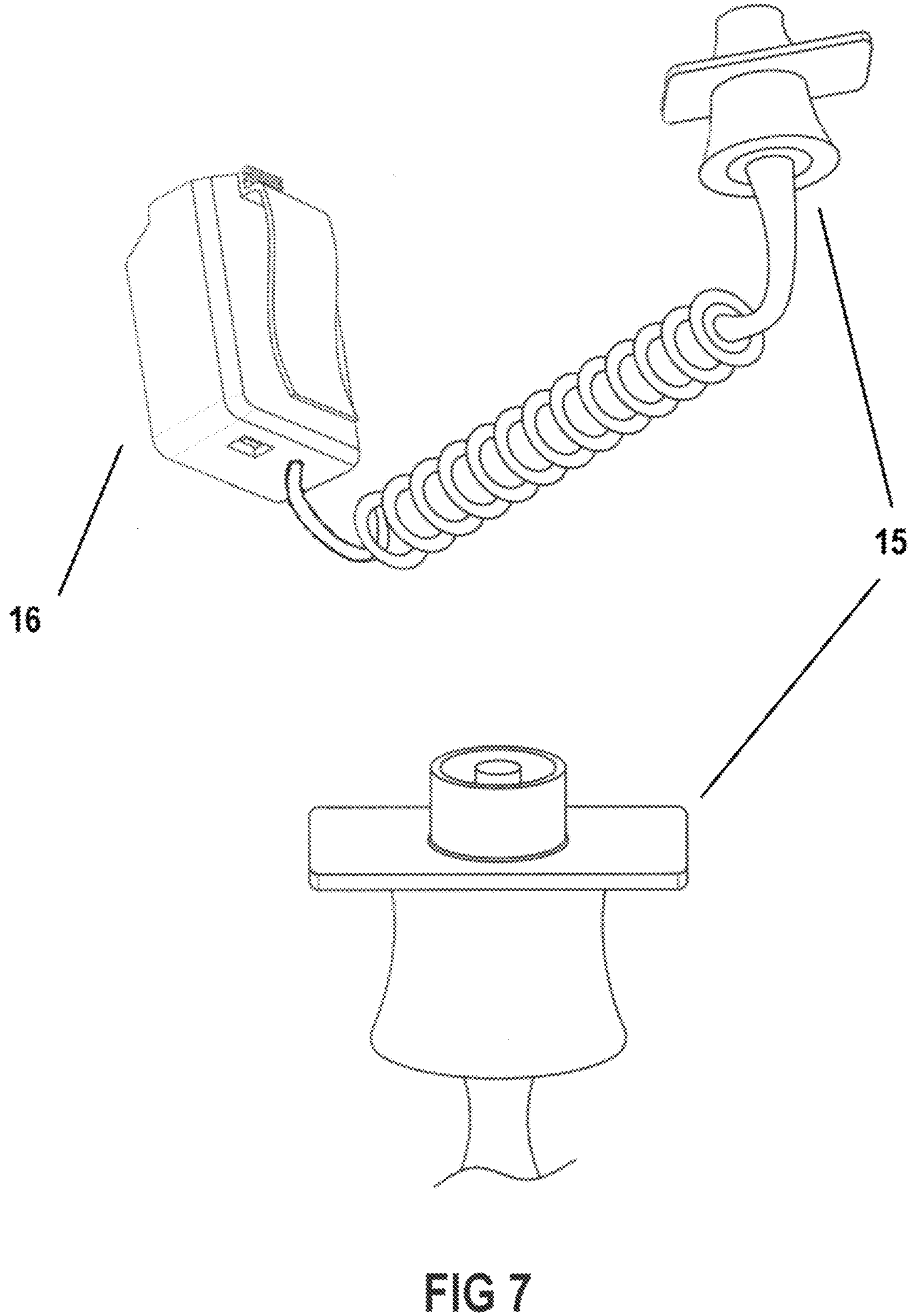
FIG. 7 is a handheld heat head device with extendable belt clip battery.
Figure 8:
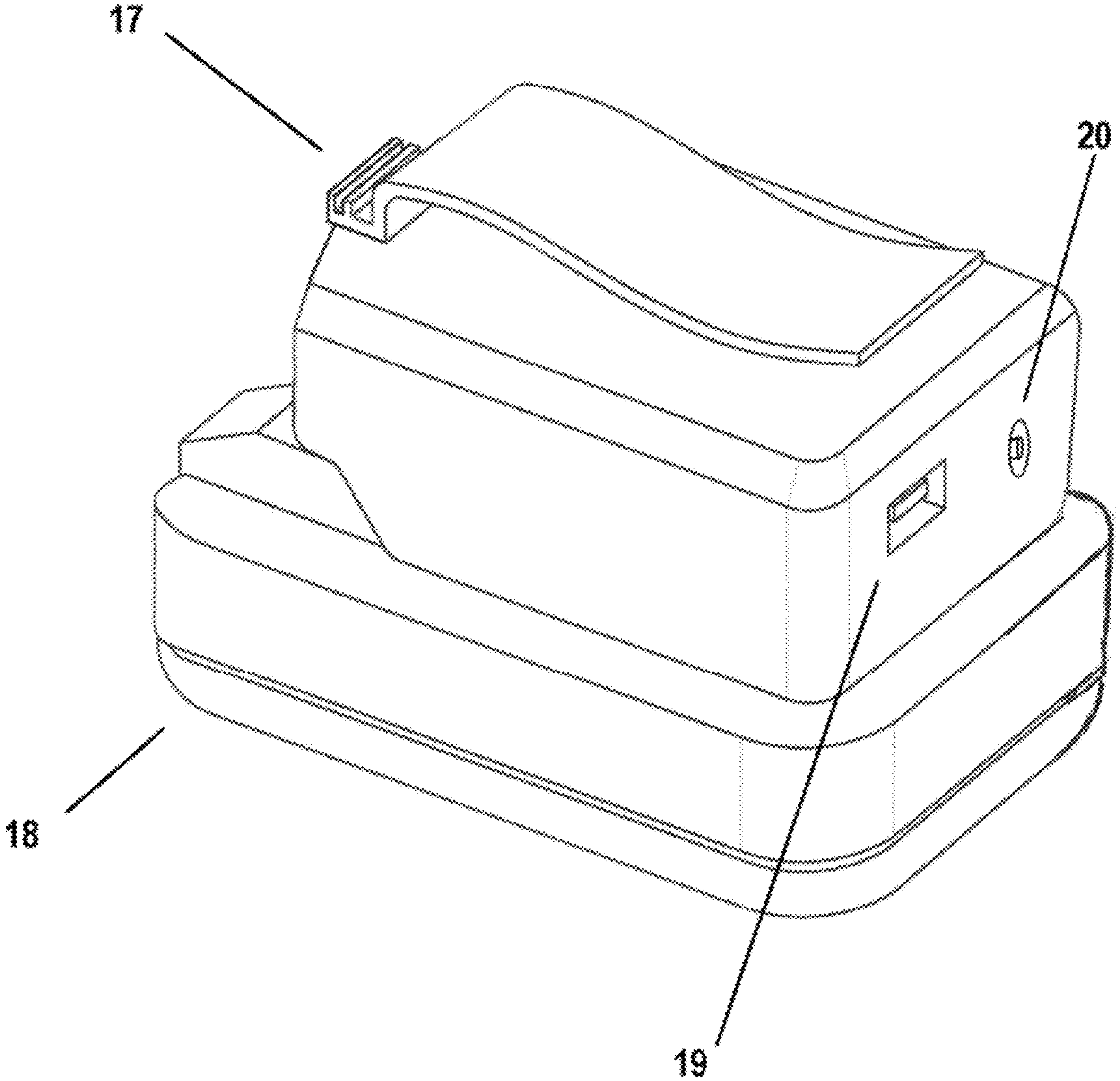
FIG. 8 is a rechargeable belt pack battery for extendable use.

FIG. 7 illustrates an embodiment that incorporates a rechargeable belt power pack (16), that is also featured in FIG. 8, that is attached to an extendable heat-head (15) allowing for additional convenience for the user of the device.

FIG. 8 illustrates the rechargeable belt power pack (17) to be recharged using a power tool battery (18) shown in this embodiment, but also showing that the belt power pack can alternatively be recharged using industry standard recharge ports (19 and 20) according to that feature of this additional embodiment.

Figure 9:
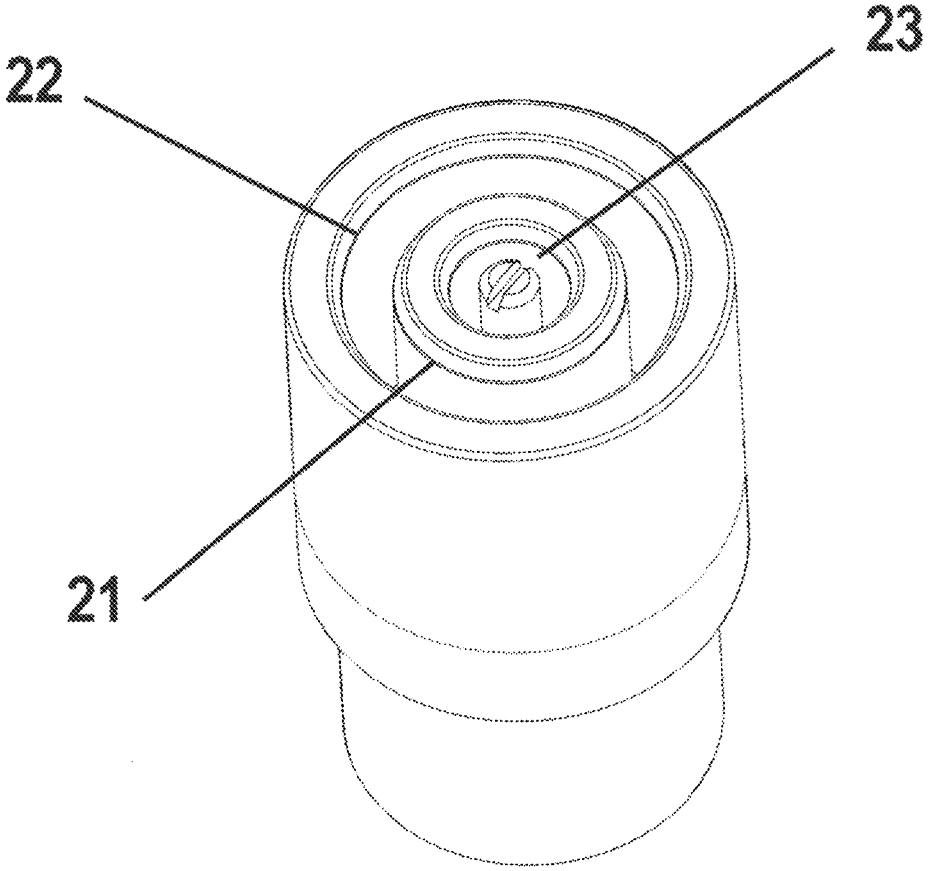
FIG. 9 is a "Heat Head" or heating element configuration for multiple tubing/pipe sizes.

FIG. 9 illustrates a "Heat Head", or heating element designed to heat multiple tubing sizes, in a single head including ⅛", ¼", ½". and flex pipe.

In this heat head embodiment, the center pin 23 will heat the ID of ⅛" tubing. The surface adjacent to the center pin will heat the OD of ¼" tubing, The next surface outward 21, will heat the ID of ½" tubing, and the next surface outward 22, Will heat the OD of Flex Pipe. Allowing for a single device with the versatility to heat many common sizes of tubing/pipe.

For ease of use, the addition to a belt clip, a lanyard or similar device for retention to the user can be employed in alternate embodiments.

Figure 10:
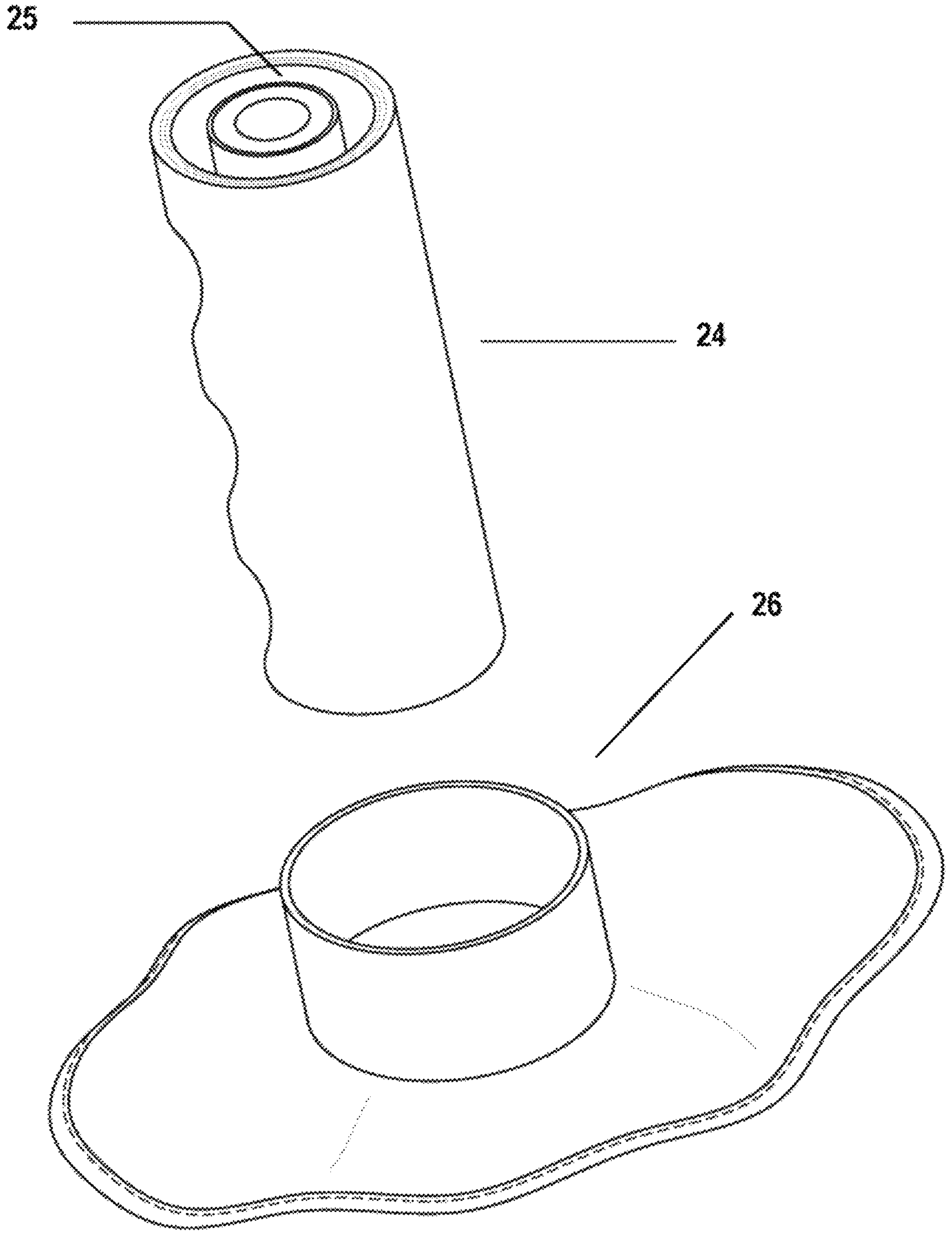
FIG. 10 is a handheld device with batteries and a disengageable temporary stand.

FIG. 10 illustrates another embodiment of a consumer-focused device (24) that incorporates internal rechargeable batteries that can be recharged utilizing industry standard recharging ports as featured in FIGS. 10 (22 and 23) and can be comfortably handheld during use and that incorporates a heat head configuration (25) similar to other embodiments shown in featured drawings herein. Also included in this embodiment is a moveable "bean bag" stand that can disengagingly provide temporary positioning of the device for convenience while being used in the field.

Figure 11:
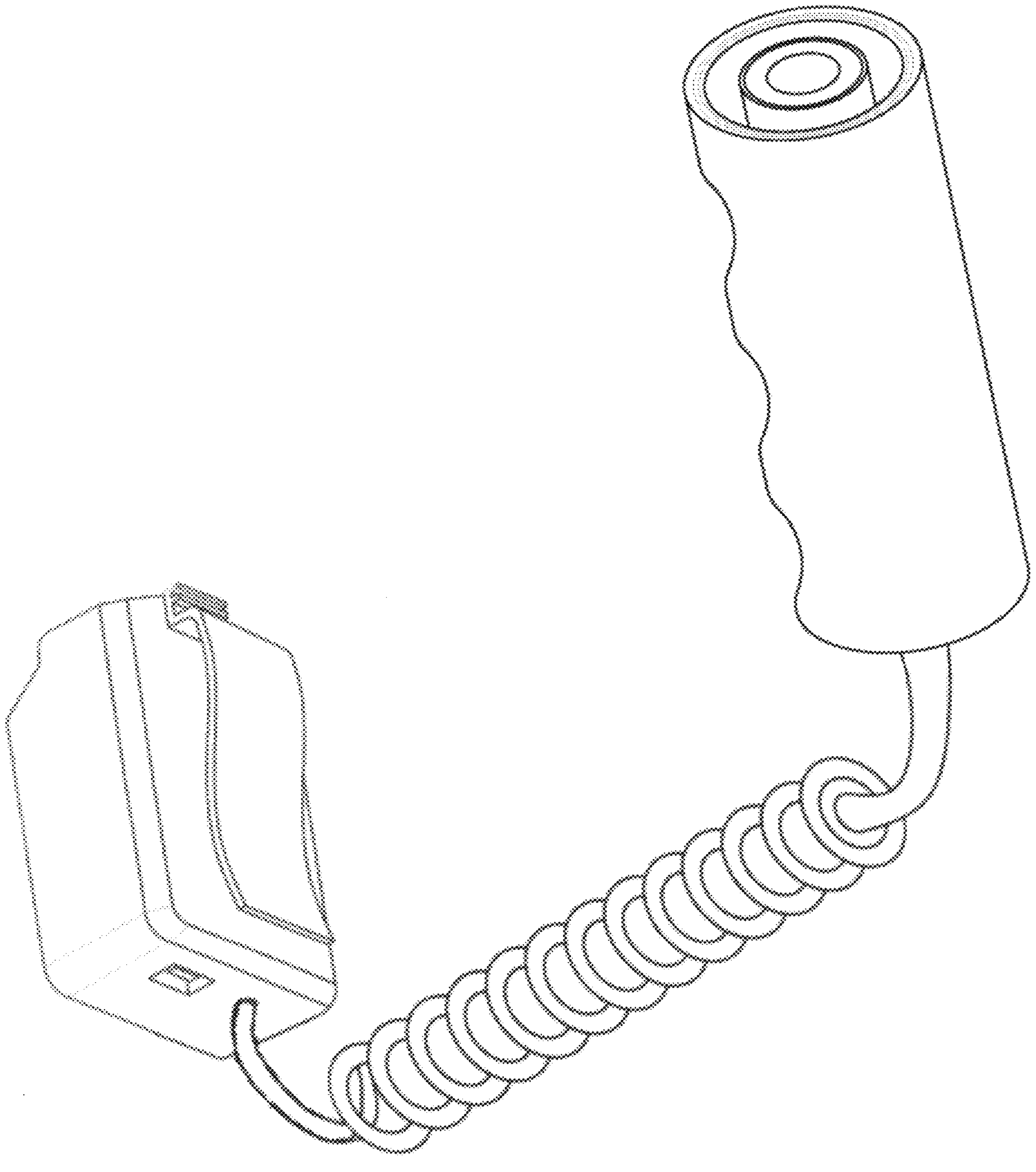
FIG. 11 is a handheld device engaged to a rechargeable long life belt battery pack.

FIG. 11 illustrates an additional embodiment of the hand-held device from FIG. 10 being incorporated into the extendable belt power pack system featured in FIGS. 7 and 8 that provides significantly greater power life when being used in the field for commercial purposes.

Figure 12:
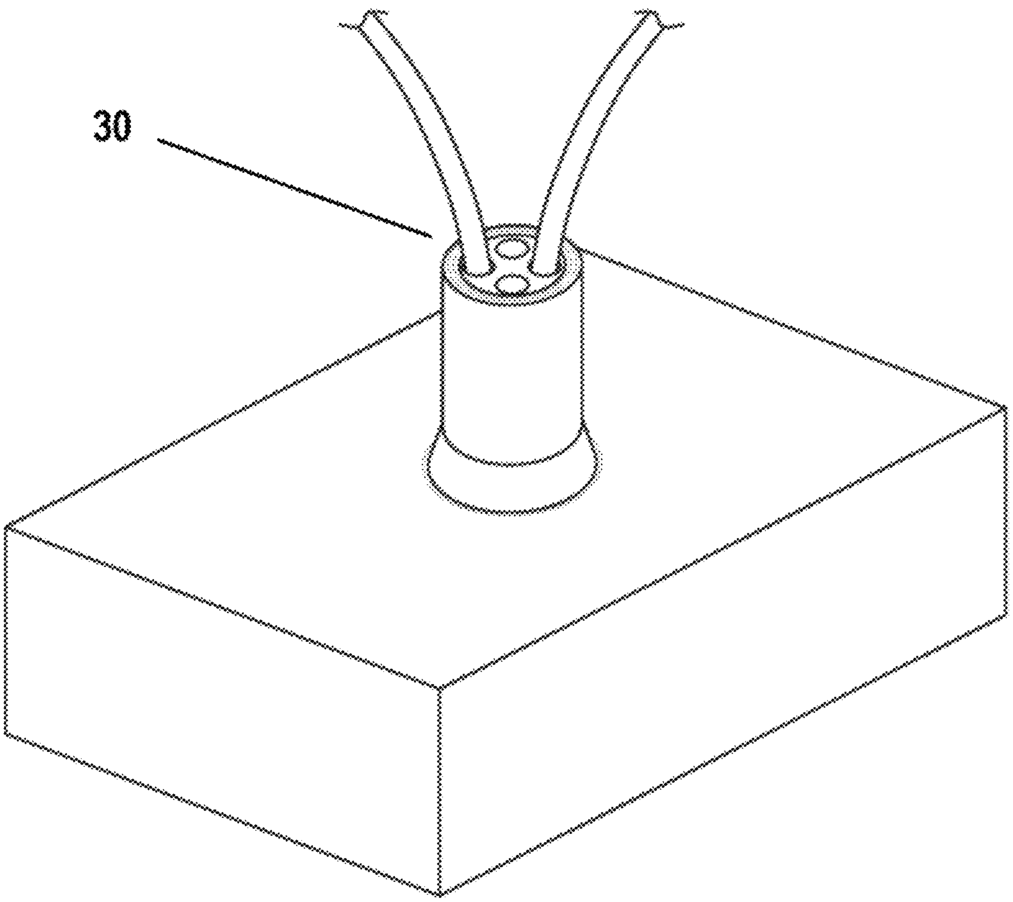
FIG. 12 is a multi-tubing heat head for small tubing.

FIG. 12 illustrates a heat head (30) that has multiple openings for the common ¼ inch small tubing that is widely used in drip irrigation installations.

Figure 13:
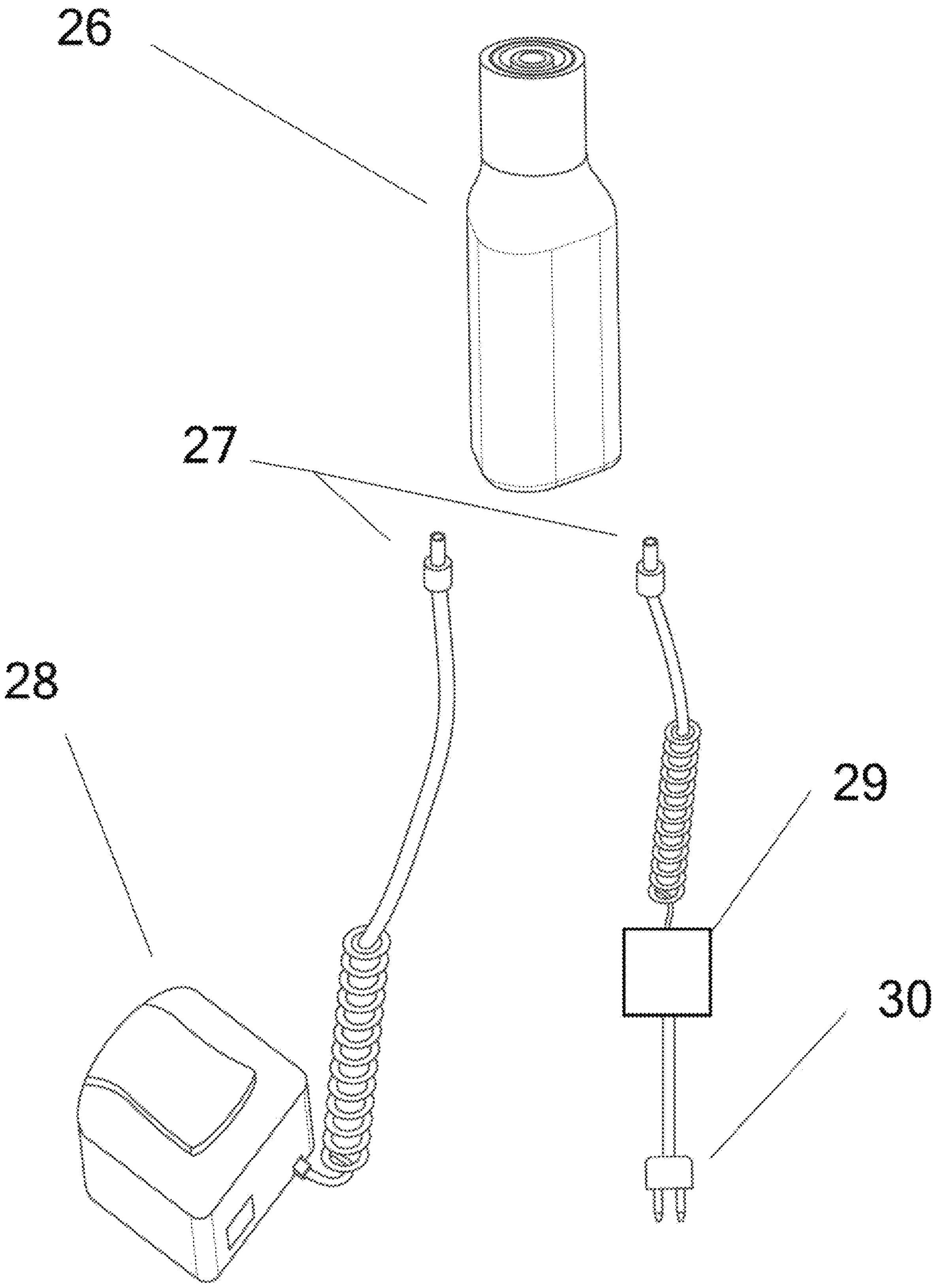
FIG. 13 is an embodiment for the handheld device which can be powered alternatively from AC power.

FIG. 13 illustrates another Embodiment for the Handheld Device (26) which can be powered alternatively, from indoors (for assembly operations or other purposes) from an AC Power source (30), with the power cord encompassing a AC-DC converter (29) by engaging the DC power plug (27) into the Handheld Device (26). Or, alternatively for field operations (where AC power is not available) by utilizing DC power from external battery source such as a Belt Clip Battery (28), by engaging its DC power plug (27) into the Handheld Device (26). An additional embodiment not shown in drawing is a receiver clip that can be included in the belt clip battery design that is capable of clipping to and temporarily and removably storing the Hand Held Device (26) when in is not in use. Another additional option is magnetic attachment whereby the handheld unit can be magnetically attached to the belt or belt clip.

Figure 14:
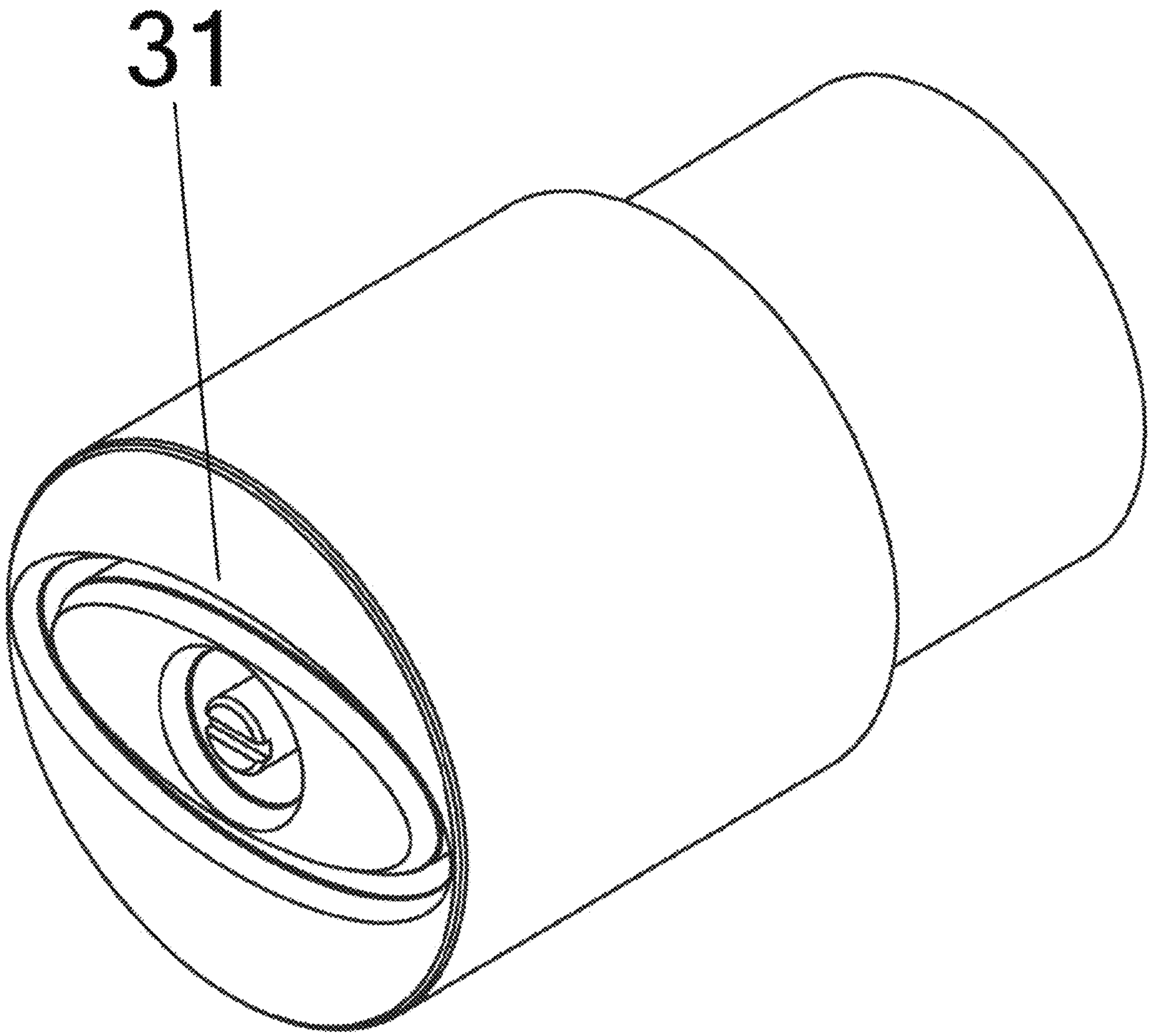
FIG. 14 illustrates an embodiment for the heat-head component in which the device exhibits a non-cylindrical shape.

FIG. 14 illustrates another Embodiment for the Heat-Head Component in which the device exhibits a non-cylindrical shape (31) to the cavities receiving the tubing of other than cylindrical shape that is to be heated. This embodiment can be modified in numerous ways to allow for the heating of a wide variety of varying shapes that are manufactured by the Irrigation Community.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description.

In one such additional embodiment, the device can be configured for interchangeable heads that accommodate different tubing shapes, sizes, and configurations. The heads can be interchangeable in a variety of ways including by a quick-connect, unscrewing, snap-on, or other similar mechanisms.

In another embodiment, adapter components allowing for compatibility with various proprietary power tool battery mating configurations can be provided which attach to the device, so as to enable the use of the device with different brands of power tool batteries.

The device can be configured to be used with various drip tape sizes and configurations. Drip tape is a thin-walled tube/pipe, lying flat upon application, only enlarging once filled with water (whereas dripline is a structured pipe that is rigid). Drip tape is a thin-walled pipeline with a common wall thickness of 0.15 mm, 0.2 mm and 0.3 mm. In comparison to Drip Line which commonly has a wall thickness of 0.9 mm to 1.2 mm.

In another embodiment, PEX pipe material which is thicker than typical drip irrigation tubing is used with a variant of the device. There are three types of PEX pipe which can be used. PEX-A is the most flexible and is suitable for use in all home water-supply plumbing needs. It is the most resistant to cracking due to freezing, as it can expand the most. PEX-A is more expensive than B or C, and has no major benefit over PEX-B besides its greater flexibility. PEX-A is manufactured using peroxide. PEX-B is stiffer than PEX-A and has a tendency to want to return to its coiled state. PEX-B can still be installed easily and expands to resist cracking due to freezing as well. PEX-B is manufactured using a moisture-cure method, and has a higher resistance to chlorine, making it a solid choice in regions where water contains higher chlorine levels. PEX-C is the stiffest of the three types of PEX, making it the most difficult to work with. It is prone to kinking and susceptible to cracks in freezing conditions. PEX-C is the cheapest option, and should only be used for small repairs that don't require much bending. PEX-C is manufactured via an irradiation method.

Prior art methods of connections using PEX pipe include using a PEX expander tool to stretch and widen the diameter of the PEX tube, copper fittings and stainless steel clamps, which all suffer from limitations compared to the embodiment of the present invention which utilizes PEX pipe with the heating device.

Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A device for heating the ends of irrigation piping and drip line tubing, comprising:

a heating element, comprising:

a temperature-controlled heat head, wherein the heat head is housed in a heat-resistant housing;

a center pin inside the heat head configured to heat the ends of irrigation piping and drip line tubing;

one or more surfaces adjacent to the center pin also inside the heat head also configured to heat the ends of irrigation piping and drip line tubing;

and a power source for the heating element;

wherein:

the housing for the heating element is configured to receive drip line irrigation tubing or other irrigation piping so as to bring the heating element in contact with the tubing or piping, while shielding the user from accidental direct contact with the heating element; wherein the housing is configured to allow for the tubing to be fully engaged with a connector with less force required to accomplish full engagement than without heat; wherein the device is configured so that following the heating and installation of the tubing over or into the connector the tubing cools and shrinks to the contours of the connector and the result is a more robust connection wherein by virtue of the heat applied to the tubing/piping a robust connection to the connectors and devices is achieved by conforming to the shape as the heated portion of the tubing/pipe shrinks back as it cools to ambient temperature.

2. The device for heating drip line irrigation tubing and piping of claim 1, further comprising a power switch.

3. The device for heating the ends of drip line irrigation tubing of claim 1, further comprising electronics or a dial to modify the amount of power or an internal temperature regulator.

4. The device for heating the ends of drip line irrigation tubing and piping of claim 1, further comprising multiple heating elements or heat heads into a single device.

5. The device for heating the ends of drip line irrigation tubing of claim 1, further comprising a stop position in the heating element assembly to attain the proper depth of the insertion of the tubing.

6. The device for heating the ends of drip line irrigation tubing and piping of claim 1, further comprising a toggle switch to control the distribution of power to the distinct heat heads.

7. The device for heating the ends of drip line irrigation tubing and piping of claim 1, further comprising a carry handle.

8. The device for heating the ends of drip line irrigation tubing and piping of claim 1, further comprising one or more rain cap(s) or environmental cap(s).

9. The device for heating the ends of drip line irrigation tubing of claim 1, wherein the power source is internal to the device, with or without recharging capabilities.

10. The device for heating the ends of drip line irrigation tubing of claim 1, wherein the power source is an external power tool battery that engagingly mates with the device to provide external power or recharging power to internal batteries.

11. The device for heating the ends of drip line irrigation pipe and tubing of claim 1, further comprising a standard DC charging port(s) or USB port(s) to the power source.

12. The device for the ends of heating drip line irrigation tubing of claim 1, further comprising a belt clip to clip the device to the belt clip that is configured utilizing the configuration of the battery connection junction.

13. The device for heating the ends of drip line irrigation tubing of claim 1, further comprising an ergonomic shape for a handheld device with internal batteries for ease of handling.

14. The device for heating the ends of drip line irrigation tubing of claim 1, further comprising a temporary moveable and disengageable stand for a handheld device for ease of use in the field.

15. The device for heating the ends of drip line irrigation tubing of claim 1, further comprising an extendible power cord allowing for mobility of the heat head remotely from the power supply.

16. The device for heating the ends of drip line irrigation tubing of claim 1, further comprising a lanyard or similar device for retention to the user.

17. The device for heating the ends of drip line irrigation tubing of claim 1, further comprising an onboard temperature regulator which can be adjusted via a circuit board.

18. The device for heating the ends of drip line irrigation tubing of claim 1, further comprising a heat head configuration that can accommodate multiple tubes simultaneously.

* * * * *